United States Patent [19]

Thore

[11] Patent Number: 5,532,977
[45] Date of Patent: Jul. 2, 1996

[54] PROCESSING METHOD FOR OBTAINING A STACK SECTION WITH ZERO OFFSETS

[75] Inventor: Pierre Thore, Pau, France

[73] Assignee: Elf Aquitaine Production, Courbevoie, France

[21] Appl. No.: 955,731

[22] PCT Filed: Mar. 20, 1992

[86] PCT No.: PCT/FR92/00257

§ 371 Date: Feb. 16, 1993

§ 102(e) Date: Feb. 16, 1993

[87] PCT Pub. No.: WO92/18883

PCT Pub. Date: Oct. 29, 1992

[30] Foreign Application Priority Data

Apr. 19, 1991 [FR] France ................... 91 04842

[51] Int. Cl.[6] .................................. G01V 1/36
[52] U.S. Cl. .................. 367/53; 367/73; 364/421
[58] Field of Search ............... 367/21, 52, 53, 367/75; 364/421

[56] References Cited

U.S. PATENT DOCUMENTS

| | | | |
|---|---|---|---|
| 4,878,205 | 10/1989 | Gelicinsky | 367/53 |
| 4,984,220 | 1/1991 | Bodine et al. | 367/68 |
| 5,008,861 | 4/1991 | Gallagher | 364/421 |
| 5,197,039 | 3/1993 | Corcoran et al. | 361/52 |

FOREIGN PATENT DOCUMENTS

| | | |
|---|---|---|
| 1393602 | 5/1975 | United Kingdom. |
| 2226884 | 7/1990 | United Kingdom. |

OTHER PUBLICATIONS

Complete copies of references R, S, V (or reference T), U, U', and X, cited by the Examiner on Form PTO–892, Paper No. 9.
Article entitled: *Encyclopedic Dictionary of Exploration Geophysics* (2 Ed.) by Robert E. Sheriff, 1984, p. 87.
Article entitled: *SIAM Journal on Applied Mathematics*, Aug. 1983, vol. 43, No. 4, pp. 981–992.
Geophysical Prospecting No. 36 (1988) pp. 223–243 E. Landa et al. "A Method for Determination of Velocity and Depth from Seismic Reflection Data".
Brochure "Imaging Complex Structure" issued by Western Geophysical (Printed 9n 1984).
Landa et al., 60th Annu SEG Int. Mtg, Sep. 27, 1990, v2, pp. 1249∞1252; abst. only provided herewith.
There et al., 60th Annu. SEG Int Mtg, Sep. 27, 1990, v2, pp. 1287–1289; abst. only provided herewith.
Landa et al., 53rd EAEG Mtg, May 30, 1991, pp. 42–43, abst. only provided herewith.
Landa et al., Geophysis, vol. 52, #p. pp. 1377–1983, Sep. 1991; abst only provided herewith.
Thore et al., Geophysical Prospecting, vol. 39, #4, pp. 453–471–May 1991; abst only herewith.
Landa et al., Geophysical Prospecting, vol. 41, #3, pp. 661–676, Aug. 1993; abst only provided herewith.
Mode et al., 49th Europe Ass Explo. Geophys. Mtg, Jun. 12, 1987, pp. 84–85; abst. only herewith.
Schoot et al., 59th Annu Prog. Soc. Explor. Geophys. Int. Mtg, Nov.2, 1989, vol. 2, pp. 1136–1139; abst. herewith.

*Primary Examiner*—Nelson Moskowitz

[57] ABSTRACT

A method and device for obtaining a zero-offset seismic section from a stack seismic section produced from stack traces recorded along a given line of survey, is disclosed. The present method and device is directed to determining an interval velocity macro-model which defines a number of reflectors along the line of survey as a function of depth; calculating from the macro-model, travel times for each of the seismic traces of each of CMP gathers and each of the reflectors of the macro-model; defining for each of the CMP gathers, as many primary indicatrices as there are reflectors in the macro-model; calculating between the primary indicatrices associated with each of the CMP gathers, as many interpolated indicatrices as there are samples over the stack trace corresponding to a given CMP gather; and stacking the seismic traces of each of the CMP gathers along the indicatrices associated with the given CMP gather, so as to produce a set of stack seismic traces obtained for all the CMP gathers constituting the zero-offset seismic section along the given line of survey.

16 Claims, 9 Drawing Sheets

FIG_1

CMP GATHERS

FIG. 2

FIG_3

MODEL 1

FIG. 9

PROCESSING METHOD FOR OBTAINING A STACK SECTION WITH ZERO OFFSETS

In order to ascertain the geometrical structure of the sub-soil geological layers, it is usual, in petroleum exploration, to study the propagation in the sub-soil of acoustic waves emitted at the surface by emitters situated at points termed "shotpoints". The waves propagate in the sub-soil and are then reflected by the reflectors constituted by the various layer boundaries and are thus returned to the surface where they provoke ground vibrations as a function of time which are recorded on receivers situated at points termed "reception points". Each recording is associated with the position of a midpoint situated in the middle of the segment joining the shotpoint and the reception point which are associated with the recording. The acquisition device is such that several different recordings can be associated with the same midpoint and that the various midpoints, generally equidistant from one another, line up along a line termed the "seismic profile".

Conventionally, each of the recordings of the set of recordings associated with a given midpoint, termed "common midpoint gather" (CMP), is processed in order to correct on the one hand the effects of obliqueness of the path followed by the acoustic wave as a function of the distance between the shotpoint and the reception point, and on the other hand to refer the recording to a given time origin. The dynamic corrections intended to correct the effects of obliqueness of the acoustic paths depend on propagation velocities termed "stacking velocities" and theoretically make it possible to simulate the recording which would have been obtained if the shotpoint and the reception point had been situated at the midpoint. Stacking the recordings of each of the gathers after corrections makes it possible to obtain stack recordings termed stack traces, whose juxtaposition following the ascending or descending coordinates of the midpoints constitutes the "stack seismic section" which can be similar to a two-dimensional deformed image of the sub-soil—time along the vertical and a distance along the horizontal. After stacking, another processing termed "post-stacking migration" is generally applied, intended to replace the seismic events in their real position so that each trace represents the acoustic image in the vertical of the associated midpoint as a function of depth.

Faced with a conventional stack section, the geophysicist usually assumes a priori that the section actually represents a section with zero offsets, that is to say comprising recordings associated with a zero emission/reception distance (offset). However, this is strictly true only if the travel times associated with a given reflector are hyperbolic. In many cases, in particular in the presence of a complex structure or large lateral variations in velocities, this assumption is false and the post-stacking migration applied to such a section will give a false image of the sub-soil.

One of the aims of the present invention is to obtain a true section with zero offsets by virtue of which the geophysicist will be able to establish as exact as possible an image of the sub-soil.

Various means of improving the stack seismic section are known, according to the problem posed. In the case of sloped events which interfere, each being associated with a different stacking velocity, it is known for example that the application of a processing operation, commonly referred to as NMO (Normal Move Out), intended to correct the effects of non-hyperbolicity as a function of the offset, followed by a partial prestacking migration commonly referred to as DMO (Dip Move Out), intended to correct the effects of dip, and which are applied to the elementary recordings of each gather is efficacious. In the case of rapid lateral variations in velocities, the problem can be solved in part by virtue of the application of static corrections compensating for their effects (prestack layer replacement).

In both cases, the processing operations applied consist in revising the estimate made at the start of the stacking velocity. However, the processing operations have limitations. The DMO can, for example, in certain cases provoke an increase in the amplitude of the multiples which are spurious events of a seismic section. The static corrections aimed at compensating for the lateral variations in velocities are tricky to apply (in the case of a complex structure) once the number of velocity slices is greater than one.

Neither of these techniques should be used unless it enables the stack section to be improved.

SUMMARY OF THE INVENTION

The methods according to the present invention makes it possible to obtain a stack seismic section with zero offsets which can be applied equally well to the cases of complex structures or of rapid variations in lateral velocities, without the disadvantages of the abovementioned processing operations.

A method according to the present invention for obtaining a stack seismic section with zero offsets, of the type comprising stacking up the CMP gather recordings recorded along a given profile, comprising the steps of:

determining from a basis stack section, an interval velocity macro-model associated with the profile processed as a function of depth, calculating from this macro-model, the travel times for each of the recordings of each of the gathers and each of the reflectors of the macro-model, calculating between the indicatrices defined by the travel times calculated in the preceding step, as many interpolated indicatrices as there are samples over the stack trace and, stacking the recordings for each of the gathers along the indicatrices defined in the preceding step.

Preferably, the travel times are calculated with the aid of a programme for ray-casting by continuation (for example according to Keller and Perruzzi).

Again preferably, the determination of the macro-model is carried out by coherence analysis on the basis of about ten reflectors which are significant in terms of velocities, defined on the first conventional basis stack section, by an interpreter.

Coherence analysis is an efficacious tool for examining interval velocities included between two seismic reflectors. It consists in producing a model of the sub-soil which maximizes a likeness calculated over the trace gathers. For further details refer to the article by E. LANDA et al. "A method for determination of velocity and depth from seismic reflection data" in the Journal "Geophysical prospecting" No. 36, p. 223 to 243, 1988, which is incorporated by reference into the present specification.

It may be necessary to take into account intermediate reflectors such that the time difference between two successive charted reflectors is not greater than 500 ms. To these reflectors, a ray migration of the time reflectors is then applied in such a way as to supplement the velocity macro-model.

Advantageously, the above method according to the present invention is repeated by taking the section resulting from the stacking obtained after applying the method as a basis stack section.

Advantageously, a post-stacking depth migration is applied to the stack section with zero offsets according to the present invention. The image obtained is then closer to reality than the image obtained by applying the same depth migration to the conventional stack section.

The combination of coherence analysis followed by stacking according to the present invention and of a migration applied to the said stacking makes it possible to obtain an image very similar to that which would be obtained by applying a pre-stacking depth migration, which is much more cumbersome to implement, and thus constitutes an efficacious tool for solving the problem of structural inversion in many cases.

Another advantage of the present invention is that it allows validation of the velocity macro-model. A knowledge of the velocities is particularly important for the processing of seismic data and for interpretation. In general, such a model is obtained by converting into interval velocities the travel times assumed with zero offset, read off from a conventional stack section interpreted with the aid of a first velocity field obtained by stacking velocity analyses (NMO), doing so by using the formula of DIX. To be reliable, this process requires good knowledge of the RMS (root mean square) velocities. Now, the stacking velocities used can differ significantly from the RMS velocities especially if the travel times are not hyperbolic.

The estimation of interval velocities in geophysics can be solved by calling upon either full wave field inversion processes, or processes using a velocity macro-model.

BRIEF DESCRIPTION OF THE DRAWINGS

Other objects and advantages of the present invention will be better understood with the description which follows of an illustrative embodiment, while referring to the attached drawing in which.

DETAILED DESCRIPTION OF THE PREFERRED EMBODIMENTS

Figure 1:
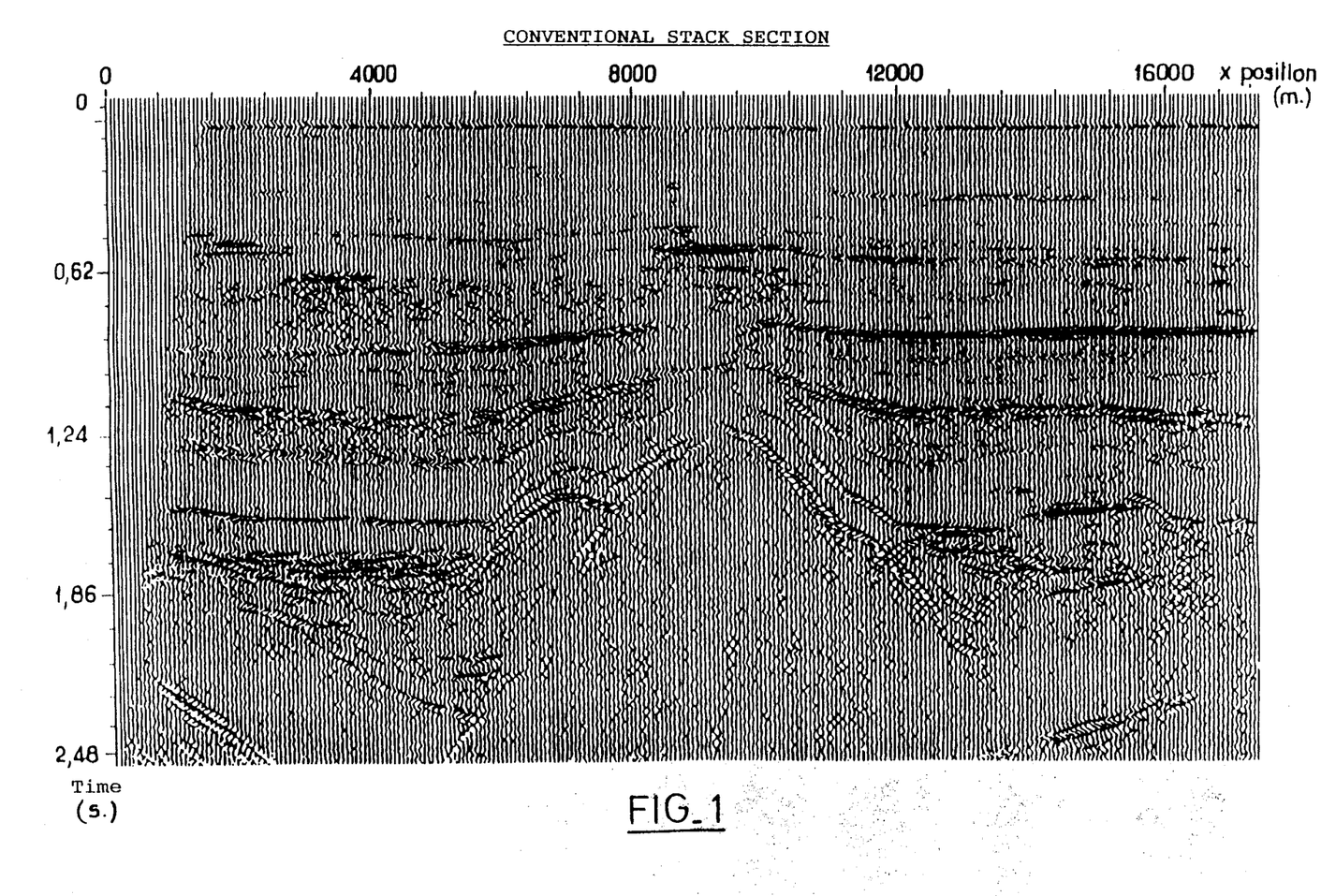
FIG. 1 represents an example of a conventionally stacked time marine section.

One result of a conventional stacking is represented in FIG. 1. FIG. 1 shows a marine seismic acquisition extending over about 16 kilometers. The conventional sampling increment for the traces is 4 milliseconds, and the distance between midpoints and between traces is 66 meters.

Figure 2:
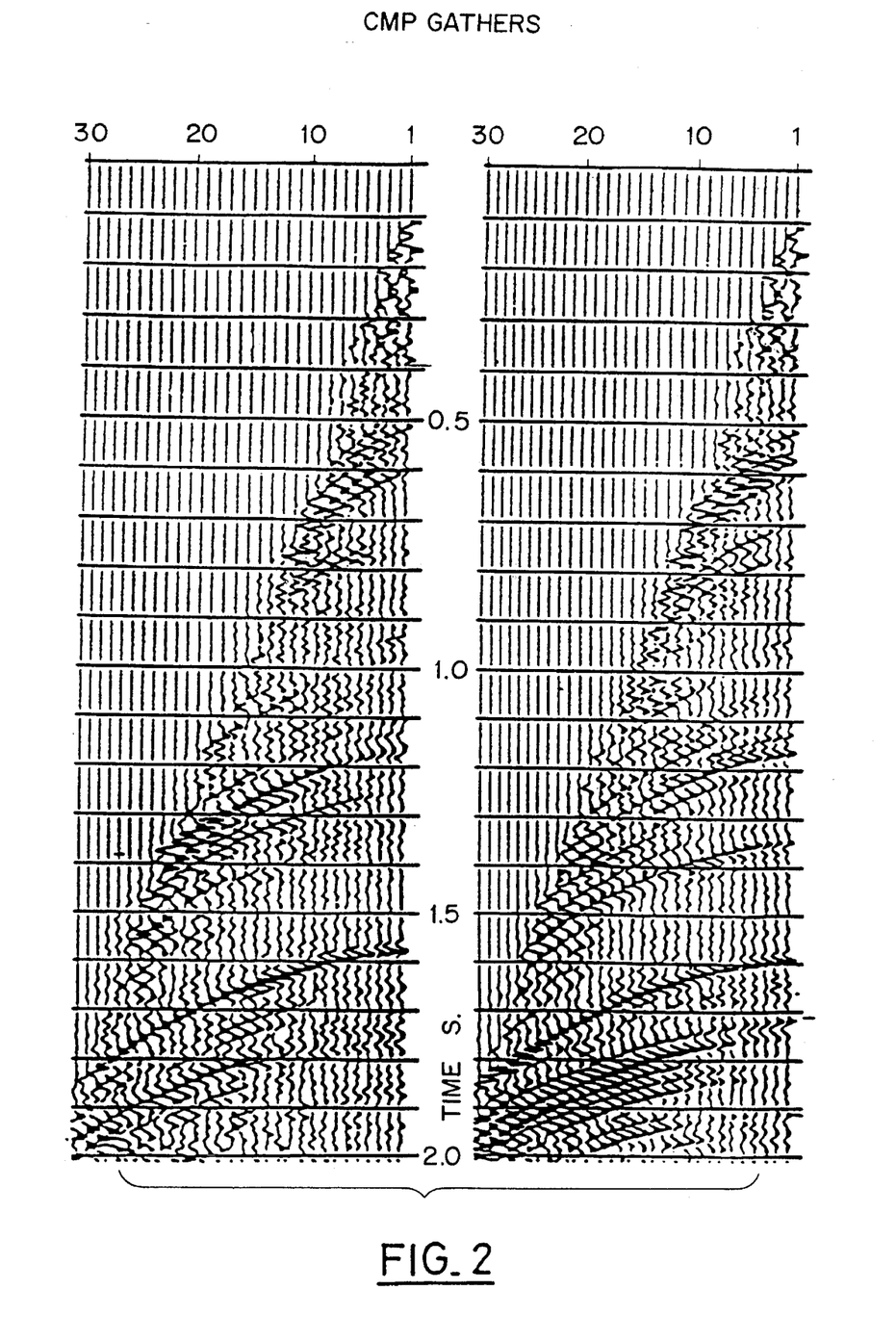
FIG. 2 represents two CMP gather examples.

FIG. 2 represents an illustrative gather of raw recordings. Each gather has 30 recordings, the minimum offset (shot-point, reception point distance) being 122 m and the inter-recording interval being 66 meters. It is seen that the signals are arranged along curves of hyperbolic shape.

Theoretically, in the conventional processing applied to these raw recordings to obtain a conventional stack section, the propagation time t associated with a reflector is regarded as being related to the vertical propagation time To and to the distance X between emitter and receiver through the following relation:

$$T = \sqrt{To^2 + X^2/V^2} \quad (1)$$

where V is a RMS velocity in theory which is approximated by the stacking velocity arising from the velocity analyses. The conventional processing will have the effect of straightening these hyperboli in order theoretically to align the signals on the same time line. Stacking will take place later. The formula (1) is strictly true only in case of flat reflectors and a homogeneous medium. It is easily appreciated that in all other cases, the post-correction signals will not be perfectly aligned and stacking will be impaired. Hence there are advantages of taking into account the rapid lateral variations in interval velocities and/or the structural variations in the reflectors especially in the case of complex structures with steep dips and widely spread acquisition devices. The aim is to determine for each set and each alignment of signals, hence for each reflector, the real curve defined by the times T as a function of one To. A stacking along these curves makes it possible to obtain a section with zero offsets having an optimal signal/noise ratio.

Figure 3:
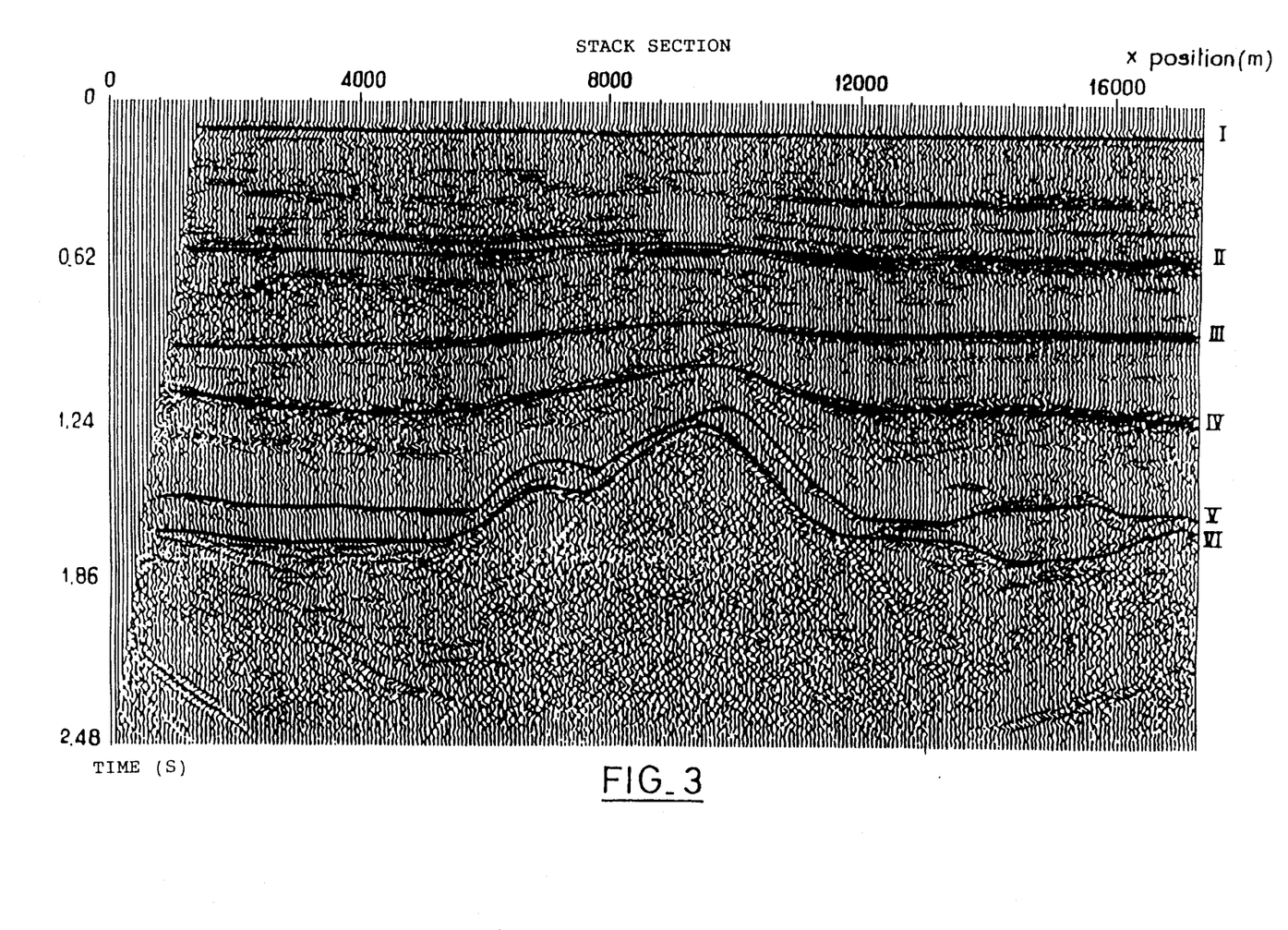
FIG. 3 represents the interpreted section of FIG. 1 in which six main reflectors have been selected from I to VI at about 0.1 s, 0..5 s, 0.95 s, 1.1 s and 1.67 s, (right-hand portion of the model)
Figure 7:
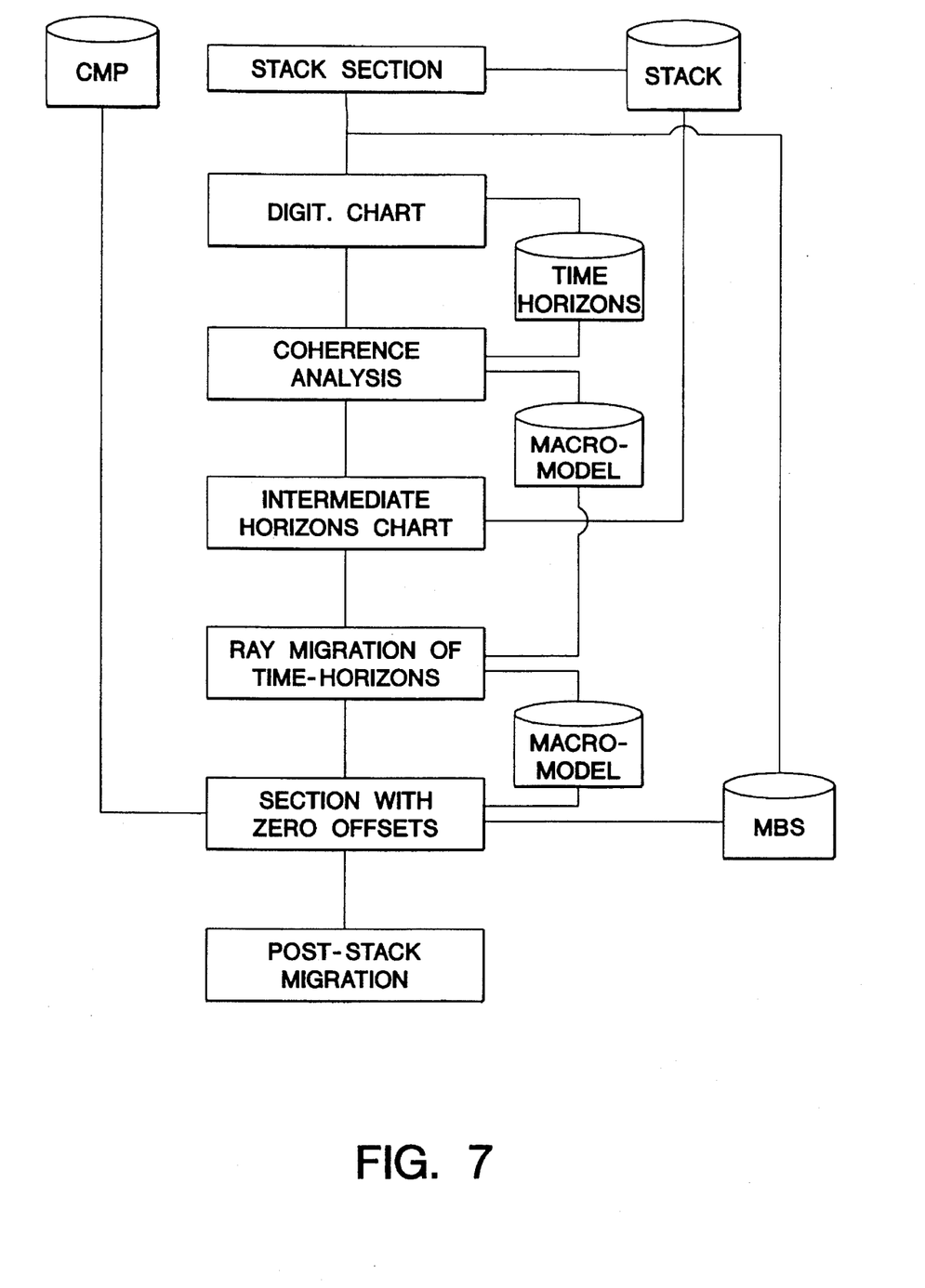
FIG. 7 represents the flow diagram of the program implemented on a computer for carrying out the processing method according to a preferred embodiment of the invention.

Determination of the "true" times of propagation involves at least the determination of a macro-model of the sub-soil. There are many methods enabling such a model to be obtained. In the example described here, the principal phases of construction of which have been shown diagrammatically in FIG. 7, from the conventional stack section of FIG. 1, have firstly been selected .and charted, manually, 6 major reflectors numbered from I to VI in FIG. 3. These 6 reflectors or time-horizons have been digitized and the resulting numbers have been stored in memory. The time-horizon chart and the CMP gathers are the input data for a macro-model computational program by coherence analysis used here and described in the publications cited earlier, which outputs the data from the velocity macro-model of FIG. 4 as a function of distance X and depth D. The inversion of velocities has been carried out horizon by horizon starting from the time chart with zero offset and with 20 groups of CMPs per reflector. The reflectors and velocities sought are modelled with the aid of Spline functions, the unknowns being the abscissae of the nodes for the reflectors and the values of the velocities at these nodes. The technique involves finding the velocity macro-model, dependent on depth, which maximize a likeness function calculated for all the pre-stack CMP gathers over time spans corresponding to the real travel times for each reflector.

The travel times are calculated with the aid of a program for ray casting by continuation (for example according to Keller and Peruzzi) and the likeness function which it is sought to maximise is calculated over a wide time span of 80 milliseconds bracketing the curve of the real travel times determined by the program.

Figure 4:
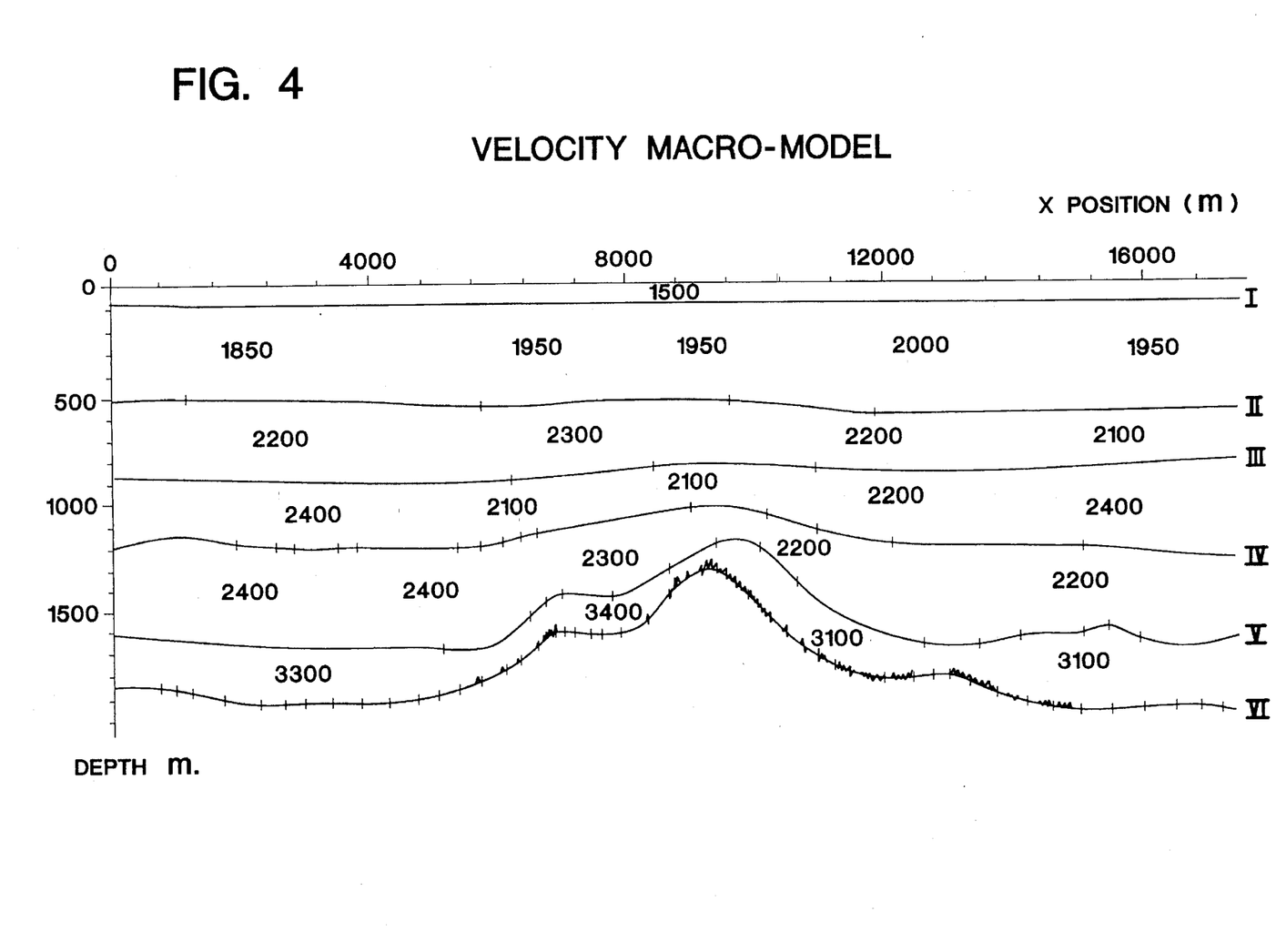
FIG. 4 represents the result of the estimate of the velocity depth macro-model on the basis of the interpretation of FIG. 3 by coherence analysis according to LANDA, the values of the slice velocities are indicated at their nodal positions.

In FIG. 4, the values of the velocities from the macro-model are printed at the locations of the nodal positions. The uncertainties in the depth position of the reflectors have also been represented in the form of vertical segments appearing on the plot of the reflectors.

It is observed that in the particular case treated, only the fourth interval, between reflectors III and IV exhibits a negative anomaly in velocities due in fact to the presence of a gas reservoir.

Having obtained the macro-model, most of the time it is necessary, in order to produce the stack according to the present invention, to define supplementary reflectors included between the main reflectors having served as a basis in the calculation of the velocity macro-model. Experience shows that indeed more reflectors are needed for stacking than for calculation of the velocity macro-model. In practice, provision will be made so that there is no time difference greater than 500 ms between two reflectors. A mean time difference of the order of 300 ms between two successive reflectors appears to be a good compromise.

In order to do this, the charting is carried out, on the conventional starting stack section, of new intermediate reflectors visible in the section and included between the major reflectors already charted, so that the time interval included between two successive reflectors is not greater than 300 ms. The effect of this charting is to introduce into the time model intermediate layers which are not significant from the velocity point of view. In the case where there is an in conformity in the section, this in conformity will have to be charted as a reflector.

A ray migration is applied to these intermediate time reflectors through the basis macro-model so as to supplement the latter with the new depth horizons corresponding to the intermediate reflectors. It is through on the one hand this supplemented depth velocity macro-model and on the other hand the initial MPS sets that the new stack section with zero offsets according to the present invention is calculated.

Knowing the macro-structure (velocities and geometry) of the sub-soil, the real propagation times of the rays reflected in succession on each of the charted reflectors will be recalculated as a function of the positions of the shotpoint and of the reception point which are associated with the trace, for each trace of each CMP gather. Each basic CMP gather is matched with a set of an equal number of traces in which there appear as many time-indicatrices (reference indicatrix) as there are reflectors charted in the supplemented macro-model. Next, between the indicatrices defined in the preceding step there are interpolated as many indicatrices as there are samples over the stack trace (every 4 ms in this instance). Experience has shown that linear interpolation between indicatrices is not best suited to the present case. In this instance, a non-linear interpolation such as $$\left(\frac{t_n}{t_n + t_{n-1}}\right)^\alpha \Delta T_n + \left(\frac{t_{n+1}}{t_n + t_{n+1}}\right)^\alpha \Delta T_{n+1} = \Delta T$$

has been preferred, where $t_n$ and $t_{n+1}$ are respectively the known times for the zero offset of the reference indicatrices $n^e$ and $(n+1)^e$, $\Delta T_n$ and $\Delta T_{n+1}$ are respectively the time differences calculated in the preceding step for the indicatrices $n^e$ and $(n+1)^e$ for the offset under study (corresponding to one trace from the set), $\Delta T$ being the time difference sought, namely the time difference between $T_0$, the multiple time of the sampling increment over the vertical with zero offset for which the interpolated indicatrix is calculated, and T the time of the interpolated indicatrix for the offset under study.

Figure 9:
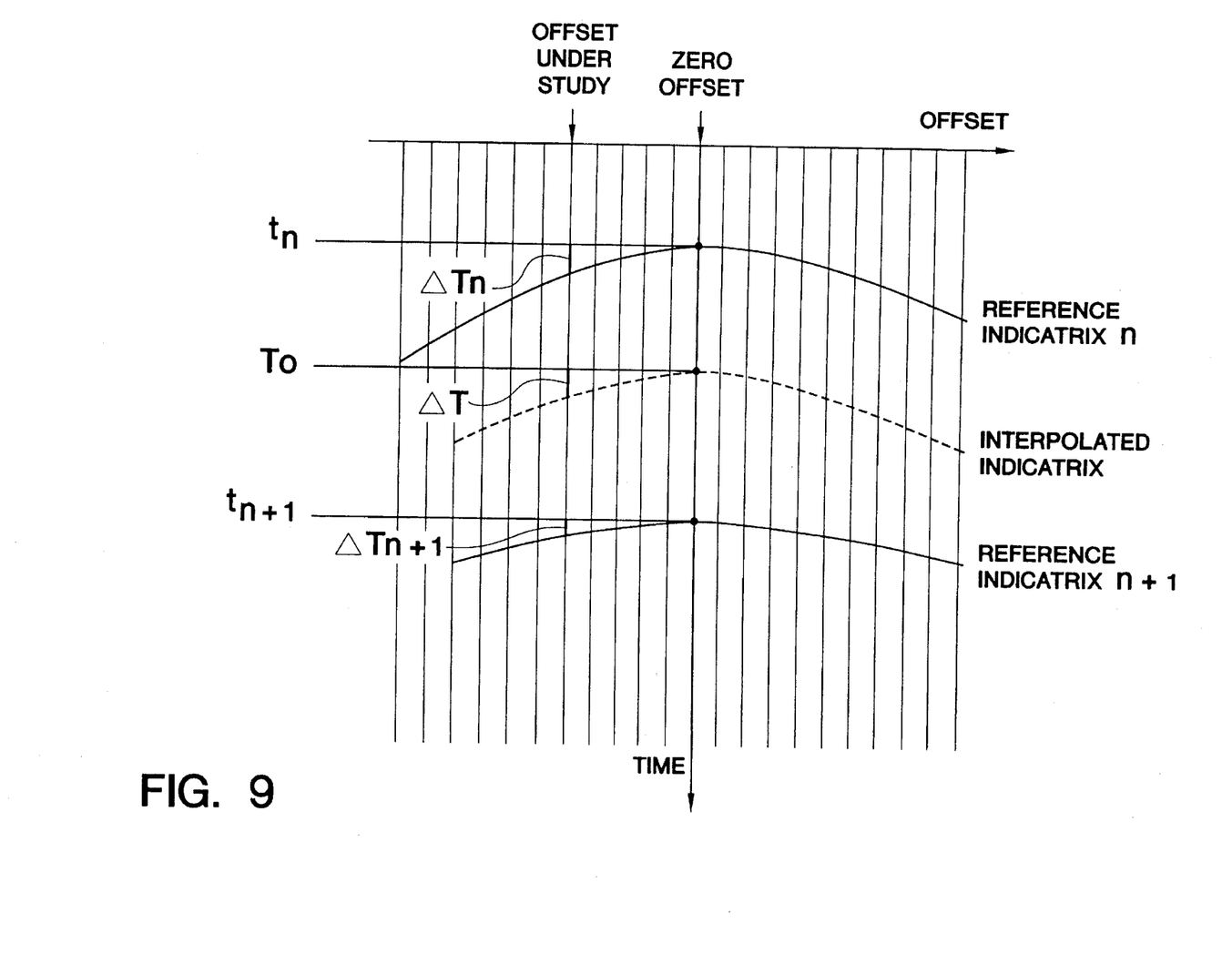
FIG. 9 represents an explanatory diagram elucidating the indicatrix interpolation procedure.

All these quantities are represented in the hypothetical example of FIG. 9 to which reference can be made for better understanding of the operations carried out.

Figure 8A:
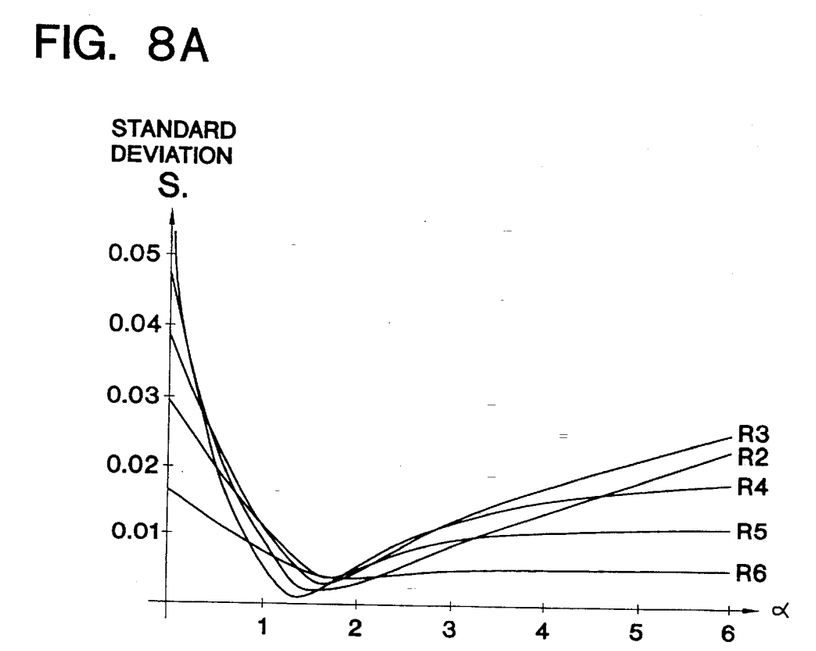
FIG. 8A represents present theoretical curves associated with the model represented in FIG. 8B, allowing the determination of the coefficient A to be applied for the preferred non-linear interpolation according to the present invention.
Figure 8B:
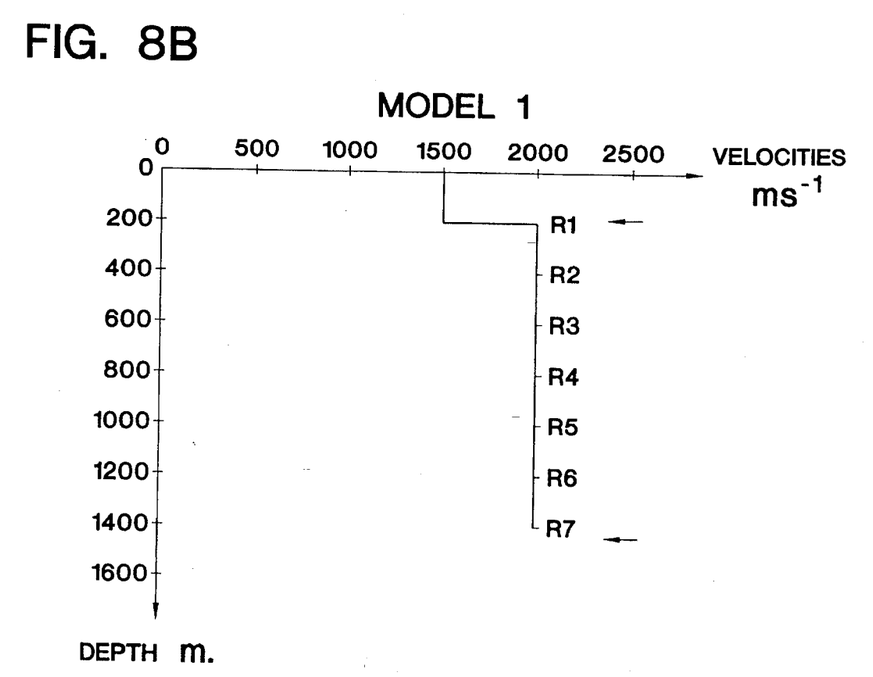

The coefficient $\alpha$ has been determined empirically through studying synthetic models such as the simple model depicted in FIG. 8B. The corresponding indicatrices have been calculated and labelled with a 30 Hz Ricker signal with an increment of 4 ms. Next, it has been sought to determine the value of $\alpha$ for which the energy along the indicatrix is optimal.

The curves of time difference, dependent on $\alpha$, between true indicatrix and interpolated indicatrix have been represented in FIG. 8A for the reflectors R2 and R6 such as defined in FIG. 8B. The indicatrices associated with reflectors R1 and R7 serve here as reference indicatrices.

It has been observed that, in the case where the layers exhibit an almost continuous variation in velocities in the vertical direction, $\alpha$ ought to be preferably between 1.2 and 1.3. In the case of a sudden variation in velocity from one layer to the next, for example greater than 500 ms, it will be preferable to take a value of between 1.4 and 1.6 for $\alpha$.

This example is given merely by way of illustration and in no way limits the invention, other interpolations being quite possibly suitable also.

Calculation of the interpolated indicatrices is done according to ascending times.

If it is necessary to interpolate above the first indicatrix of the macro-model, the calculations will be done on the basis of a constant predetermined theoretical velocity.

For large times, the latest indicatrix calculated will be repeated as many times as necessary, this being justified by the fact that the indicatrices for the large times are virtually flat owing to the high velocities. If, for a certain offset, one of the indicatrices of order n or of order n+1 is missing, the interpolation is not carried out and we pass on to the succeeding offsets and then to the calculation of the next indicatrix.

At the end of the interpolation procedure, there are obtained, associated with each of the CMP gather as many indicatrices as there will be samples over the final stack trace.

The next step involves constructing the stack traces according to the present invention. Each sample of each stack trace at time $T_0$ is equal to the stack of the samples of the CMP gather whose times correspond to those defined by the indicatrix associated with time $T_0$.

The value of the sample thus obtained may possibly be normed.

Figure 5:
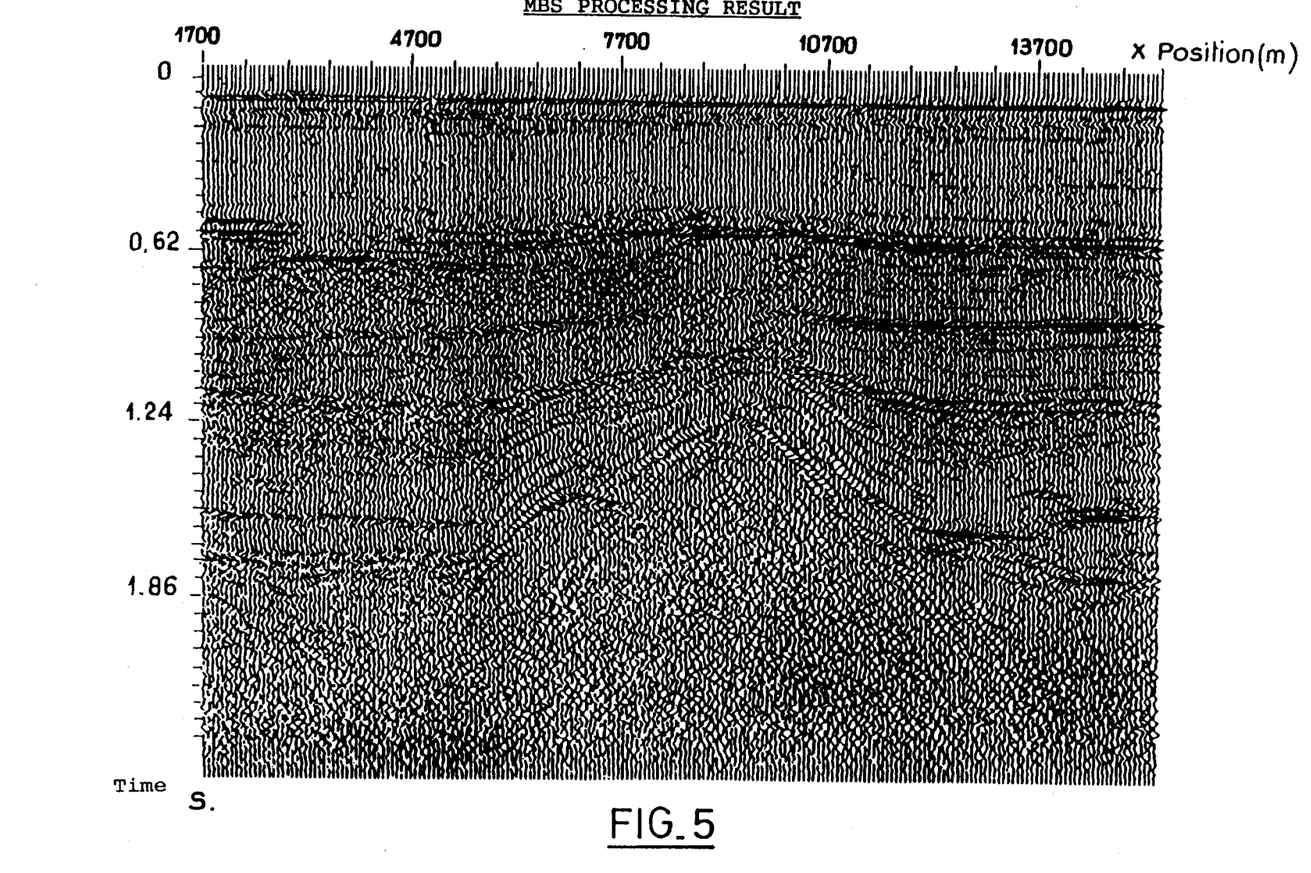
FIG. 5 represents an example of a section stacked according to the present invention on the basis of the macro-model of FIG. 4.

The stack section obtained in this way from the initial section of FIG. 1 and the macro-model of FIG. 4 has been represented in FIG. 5.

Apart from a better signal/noise ratio in general, it is observed in this section that the sloped events which appeared under reflector VI have disappeared. By contrast, an attenuation is observed in the amplitude of the reflectors situated in the second layer of the model between reflectors I and II. This is due to a poor fit of the velocity model. Such a method is fairly sensitive to the velocities of the macro-model and can therefore be a tool for validating a velocity model. Indeed, after processing, the reflectors will appear more pronounced if the velocity is fitted and less well pronounced if the velocity is not right.

For this reason it may be advantageous, since the computation procedure being relatively fast and inexpensive by comparison with other processing operations carried out before stacking, to repeat the method as indicated in FIG. 9 as an example, by regarding the section obtained according to the method (MBS section or "Model Based Stack") as the starting section.

Figure 6:
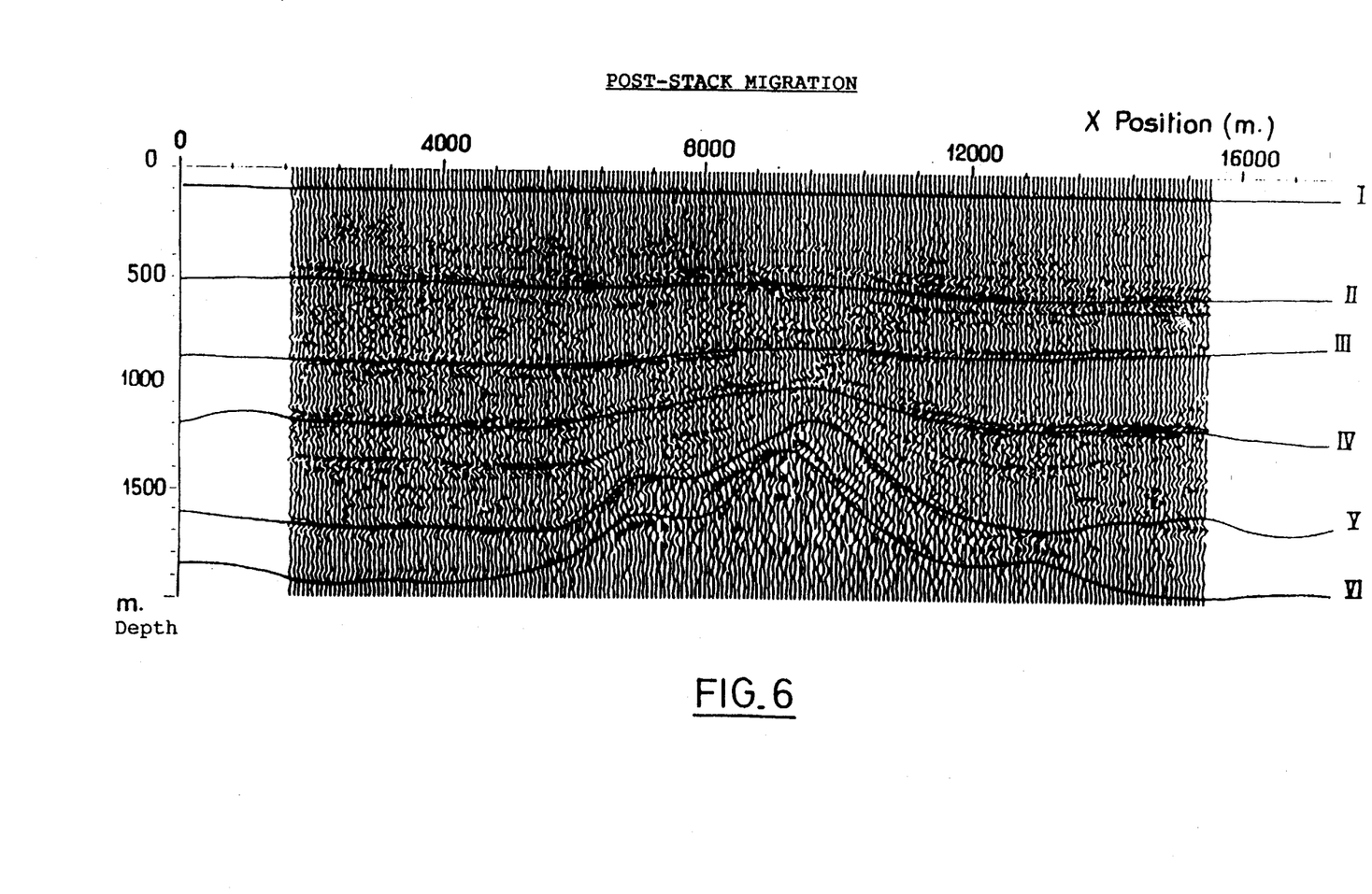
FIG. 6 represents the section of FIG. 5 to which a post-stacking depth migration has been applied.

FIG. 6 depicts a result of a depth migration applied to the section of FIG. 5 on which have been plotted the major reflectors of the velocity macro-model of FIG. 4. The results thus obtained are entirely comparable to those which may be obtained by carrying out a pre-stack migration, which involves a much greater computation time, and are better than those which would have been obtained by applying the same depth migration to the conventional stack section. Nevertheless, a slight shift is noted between the velocity model and the result of the migration, in the vicinity of reflector VI. An additional iteration would be necessary in this instance to perfect the result.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method for obtaining a stack seismic section with zero offsets by stacking up CMP gather recordings recorded along a given profile, comprising the steps of:

(a) determining from a basis tack section, an interval velocity macro-model associated with the profile processed as a function of depth;

(b) calculating from said macro-mode, travel times for each of the recordings of each of gathers and each of reflectors of the macro-model;

(c) calculating between indicatrices defined by said travel times calculated in said step (b), as many interpolated indicatrices as there are samples over a stack trace; and (d) stacking the recordings for each of the gathers along said indicatrices defined in said step (c).

2. The method according to claim 1, wherein said determining step (a) is carried out by coherence analysis on the basis of reflectors which are significant in terms of velocity, selected over a first stack section by an interpreter.

3. The method according to claim 1 or 2, wherein said travel times are calculated with an aid of a ray casting program.

4. The method according to claim 1, wherein immediate reflectors are taken into account such that the time difference between two successive charted reflectors is not greater than 500 ms and that a ray migration of time reflectors is applied to said intermediate reflectors so as to supplement the velocity macro-model.

5. The method according to claim 1, wherein said calculating step (c) includes interpolating the indicatrices associated with each time increment, such that, $$\left(\frac{t_n}{t_n+t_{n+1}}\right)^\alpha \Delta T_n + \left(\frac{t_{n+1}}{t_n+t_{n+1}}\right)^\alpha \Delta T_{n+1} = \Delta T$$

where $t_n$ and $t_{n+1}$ are respectively the known times for the zero offset of reference indicatrices $n^e$ and $(n+1)^e$, $\Delta T_n$ and $\Delta T_{n+1}$ are respectively the time differences for the reference indicatrices $n^e$ and $(n+1)^e$ for an offset under study, $\Delta T$ is a time difference between the time over the vertical with zero offset for which the interpolated indicatrix is calculated and the a time of the interpolated indicatrix for the offset under study.

6. The method according to claim 1, wherein steps (a)–(d) are repeated by taking a section resulting from the stacking obtained from the stacking step (d) as a basis stack section.

7. The method according to claim 1, further comprising:

applying a depth migration to a stack section obtained from stacking said recordings in the stacking step (d).

8. A method for obtaining a zero-offset seismic section from a stack seismic section produced from stack traces recorded along a given line of survey, comprising the steps of:

(a) determining an interval velocity macro-model which defines a number of reflectors along said line of survey as a function of depth;

(b) calculating from said macro-model, travel times for each of the seismic traces of each of CMP gathers and each of the reflectors of the macro-model;

(c) defining for each of the CMP gathers, as many primary indicatrices as there are reflectors in the macro-model;

(d) calculating between the primary indicatrices associated with each of the CMP gathers, as many interpolated indicatrices as there are samples over the stack trace corresponding to a given CMP gather; and (e) stacking the seismic traces of each of the CMP gathers along the indicatrices associated with said given CMP gather, so as to produce a set of stack seismic traces obtained for all the CMP gathers constituting the zero-offset seismic section along said line of survey.

9. The method of claim 8, wherein said stack traces are obtained by stacking a plurality of said CMP gathers which are obtained by sorting a number of said seismic traces recorded along the given line of survey.

10. The method of claim 8, wherein said reflectors in the determining step (a) correspond at least to reflectors substantially appearing on the stack seismic section.

11. The method of claim 9, wherein said determining step (a) further includes defining velocity values within layers between the reflectors, using information associated with the production of the stack seismic section.

12. The method of claim 8, wherein said macro-model further defines velocity values within layers between the reflectors, using information associated with the production of the stack seismic section.

13. The method of claim 8, wherein said defining step (c) includes relating the calculated travel times, which are associated with the seismic traces of said given CMP gather for each of the reflectors, to an offset of said seismic traces.

14. The method of claim 8, wherein said determining step (a) is performed by coherence analysis based on said reflectors.

15. The method of claim 8, wherein said travel times are calculated with an aid of a ray casting program.

16. The method of claim 8, wherein the number of reflectors defined in said velocity macro-model is such that there is no time difference greater than 500 ms between a propagation time of seismic waves at the zero-offset for any two consecutive reflectors.

* * * * *

UNITED STATES PATENT AND TRADEMARK OFFICE
CERTIFICATE OF CORRECTION

PATENT NO. : 5,532,977
DATED : July 2, 1996
INVENTOR(S) : Pierre Thore

It is certified that error appears in the above-indentified patent and that said Letters Patent is hereby corrected as shown below:

```
Column 2, line 19, delete "methods" and insert --method--.
          line 28, delete "comprising" and insert --comprises--.

Column 3, line 56, delete "present".

Column 7, line 21, delete "tack" and insert --stack--.
          line 24, delete "macro-mode" and insert --macro-model--.
          line 39, delete "immediate" and insert --intermediate--.
          line 58, delete "a".
```

Signed and Sealed this

Fifteenth Day of July, 1997

*Attest:*

BRUCE LEHMAN

*Attesting Officer*  *Commissioner of Patents and Trademarks*